United States Patent
Lackey et al.

(10) Patent No.: US 10,972,461 B2
(45) Date of Patent: Apr. 6, 2021

(54) DEVICE AWARE NETWORK COMMUNICATION MANAGEMENT

(71) Applicant: International Business Machines Corporation, Armonk, NY (US)

(72) Inventors: Brandon Lackey, Austin, TX (US); Justin Ginn, Austin, TX (US); Tony Sawan, Round Rock, TX (US); Ryan Bergsma, Cedar Park, TX (US); Ricardo Escobar, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 330 days.

(21) Appl. No.: 16/115,168

(22) Filed: Aug. 28, 2018

(65) Prior Publication Data
US 2020/0076799 A1  Mar. 5, 2020

(51) Int. Cl.
*H04L 29/06* (2006.01)
*G06F 21/44* (2013.01)

(52) U.S. Cl.
CPC .......... *H04L 63/0876* (2013.01); *G06F 21/44* (2013.01); *H04L 63/10* (2013.01); *H04L 63/1425* (2013.01); *H04L 63/1458* (2013.01)

(58) Field of Classification Search
CPC . H04L 63/0876; H04L 63/10; H04L 63/1425; H04L 63/1458; G06F 21/44
See application file for complete search history.

(56) References Cited

U.S. PATENT DOCUMENTS

| | | |
|---|---|---|
| 6,530,024 B1 | 3/2003 | Proctor |
| 6,715,084 B2 | 3/2004 | Aaron et al. |
| 7,047,564 B2 | 5/2006 | Cohen |
| 7,322,044 B2 | 1/2008 | Hrastar |
| 7,966,659 B1 | 6/2011 | Wilkinson et al. |
| 9,781,019 B1 * | 10/2017 | Cooley .................. H04L 43/04 |
| 9,906,544 B1 * | 2/2018 | Kurupati ............. H04L 63/1425 |
| 10,419,931 B1 * | 9/2019 | Sohail ....................... G06F 8/65 |
| 2004/0030927 A1 | 2/2004 | Zuk |
| 2006/0059551 A1 | 3/2006 | Borella |
| 2007/0204338 A1 | 8/2007 | Aiello et al. |
| 2007/0226781 A1 | 9/2007 | Chen et al. |
| 2010/0036779 A1 | 2/2010 | Sadeh-Koniecpol et al. |
| 2016/0261465 A1 | 9/2016 | Gupta et al. |
| 2017/0078170 A1 | 3/2017 | Vasseur et al. |
| 2017/0208079 A1 | 7/2017 | Cammarota et al. |

(Continued)

OTHER PUBLICATIONS

Hafeez et al., "IoTurva: Securing Device-to-Device (D2D) Communication in IoT Networks," CHANTS '17 Proceedings of the 12th Workshop on Challenged Networks, Snowbird, Utah, USA, Oct. 16-20, 2017, pp. 1-6.

(Continued)

*Primary Examiner* — Hosuk Song
*Assistant Examiner* — Stephen T Gundry
(74) *Attorney, Agent, or Firm* — Yee & Associates, P.C.

(57) ABSTRACT

Managing network communications is provided. An indication that a network device has been added to a local network is received. In response to receiving the indication that the network device been added to the local network, metrics corresponding to the network device added to the local network are detected. A device fingerprint corresponding to the network device added to the local network is generated based on the detected metrics.

14 Claims, 6 Drawing Sheets

(56) References Cited

U.S. PATENT DOCUMENTS

| | | | |
|---|---|---|---|
| 2017/0238183 A1* | 8/2017 | Keidar | H04L 63/0876 726/7 |
| 2018/0041528 A1 | 2/2018 | Machlica et al. | |
| 2018/0255082 A1* | 9/2018 | Ostergaard | B60R 16/0231 |
| 2018/0359269 A1* | 12/2018 | Caceres | H04L 63/1425 |
| 2019/0124118 A1* | 4/2019 | Swafford | H04L 67/025 |
| 2019/0166144 A1* | 5/2019 | Mirsky | H04W 12/1204 |
| 2019/0215688 A1* | 7/2019 | Zavesky | H04L 63/00 |
| 2019/0260785 A1* | 8/2019 | Jenkinson | H04L 51/12 |
| 2019/0289035 A1* | 9/2019 | Ahuja | H04L 63/20 |
| 2019/0297078 A1* | 9/2019 | Davis, III | H04L 63/205 |
| 2019/0303908 A1* | 10/2019 | Sokolov | G06F 21/552 |
| 2019/0312839 A1* | 10/2019 | Grimm | H04L 63/1416 |
| 2019/0312887 A1* | 10/2019 | Grimm | H04L 63/0236 |
| 2019/0342312 A1* | 11/2019 | Watkiss | H04L 63/1425 |
| 2020/0028862 A1* | 1/2020 | Lin | H04L 63/1441 |
| 2020/0045078 A1* | 2/2020 | Sun | H04L 63/1491 |
| 2020/0067930 A1* | 2/2020 | Goeringer | H04L 63/1425 |
| 2020/0067952 A1* | 2/2020 | Deaguero | H04L 43/062 |
| 2020/0077265 A1* | 3/2020 | Singh | H04L 67/16 |
| 2020/0279051 A1* | 9/2020 | Goldfarb | H04L 63/105 |

OTHER PUBLICATIONS

Tinati et al., "The Role of Crowdsourcing in the Emerging Internet-of Things," International World Wide Web Conference Committee, Perth, Australia, Apr. 3-7, 2017, pp. 1669-1672.

Ferrando et al., "Classification of Device Behavior in Internet of Things Infrastructures: Towards Distinguishing the Abnormal From Security Threats," International Conference on Internet of Things and Machine Learning, Liverpool, United Kingdom, Oct. 17-18, 2017, 8 pp.

Pawar et al., "Internet of Things Device Behavioral Analysis and Anomaly Detection as Function of Configuration," An IP.com Prior Art Database Technical Disclosure, Nov. 1, 2017, 8 pp. https://ip.com/IPCOM/000251438.

Lee et al., "Real-time Autonomous Crowd-Control System Via Detection of Crowd Anomalies from Peer-to-Peer Devices," An IP.com Prior Art Database Technical Disclosure, May 2, 2016, 8 pp. https://ip.com/IPCOM/000246067.

Mani et al., "Establishing Behavioral Policy based Authorization Profiles in Internet of Things," An IP.com Prior Art Database Technical Disclosure, Jan. 22, 2018, 5 pp. https://priorart.ip.com/IPCOM/000252541.

* cited by examiner

DEVICE AWARE NETWORK COMMUNICATION MANAGEMENT

BACKGROUND

1. Field

The disclosure relates generally to network security and more specifically to managing internal and external network communications to and from a network device connected to a local network.

2. Description of the Related Art

Network security consists of policies and practices adopted to prevent and monitor unauthorized access, misuse, modification, or denial of a network and network-accessible resources. Network security covers a variety of networks that are used in everyday jobs and conducting transactions and communications among businesses, government agencies, and individuals, for example. Networks can be private, such as within a home or company, and others can be public, which are open to public access. The most common way of protecting a network-accessible resource is by assigning a resource a unique name and a corresponding password.

However, networks are subject to attack from malicious sources. Attacks may be passive or active. A passive attack is, for example, when a network intruder intercepts data traveling through the network. An active attack is, for example, when an intruder disrupts a network's normal operation.

A denial-of-service (DoS) attack is an attempt to make a network device or network resource unavailable or available with a very low level of service, such as an unacceptable amount of response time, by consuming its resources so that it can no longer provide its intended service. A DoS attack that is sent by multiple devices is referred to as a distributed denial-of-service attack (DDoS). Typically, DDoS attacks are highly distributed and well-coordinated offensive assaults on network services, devices, and infrastructure.

With the rapid growth of the number of Internet of Things (IoT) devices, problems associated with DDoS attacks may become more and more severe. The IoT is a network of physical devices, such as, for example, smart appliances, smart televisions, smart thermostats, smart watches, smart phones, smart heart monitors, smart pacemakers, smart wearables, gaming devices, sensors, and the like, which are embedded with data processing systems and connectivity enabling these devices to connect and exchange data. Each device is uniquely identifiable through its embedded data processing system and is able to inter-operate within existing network infrastructures.

SUMMARY

According to one illustrative embodiment, a method for managing network communications is provided. A data processing system receives an indication that a network device has been added to a local network connected to the data processing system. In response to the data processing system receiving the indication that the network device been added to the local network, the data processing system detects metrics corresponding to the network device added to the local network. The data processing system generates a device fingerprint corresponding to the network device added to the local network based on the detected metrics. According to other illustrative embodiments, a data processing system and computer program product for managing network communications are provided.

DETAILED DESCRIPTION

Figure 1:
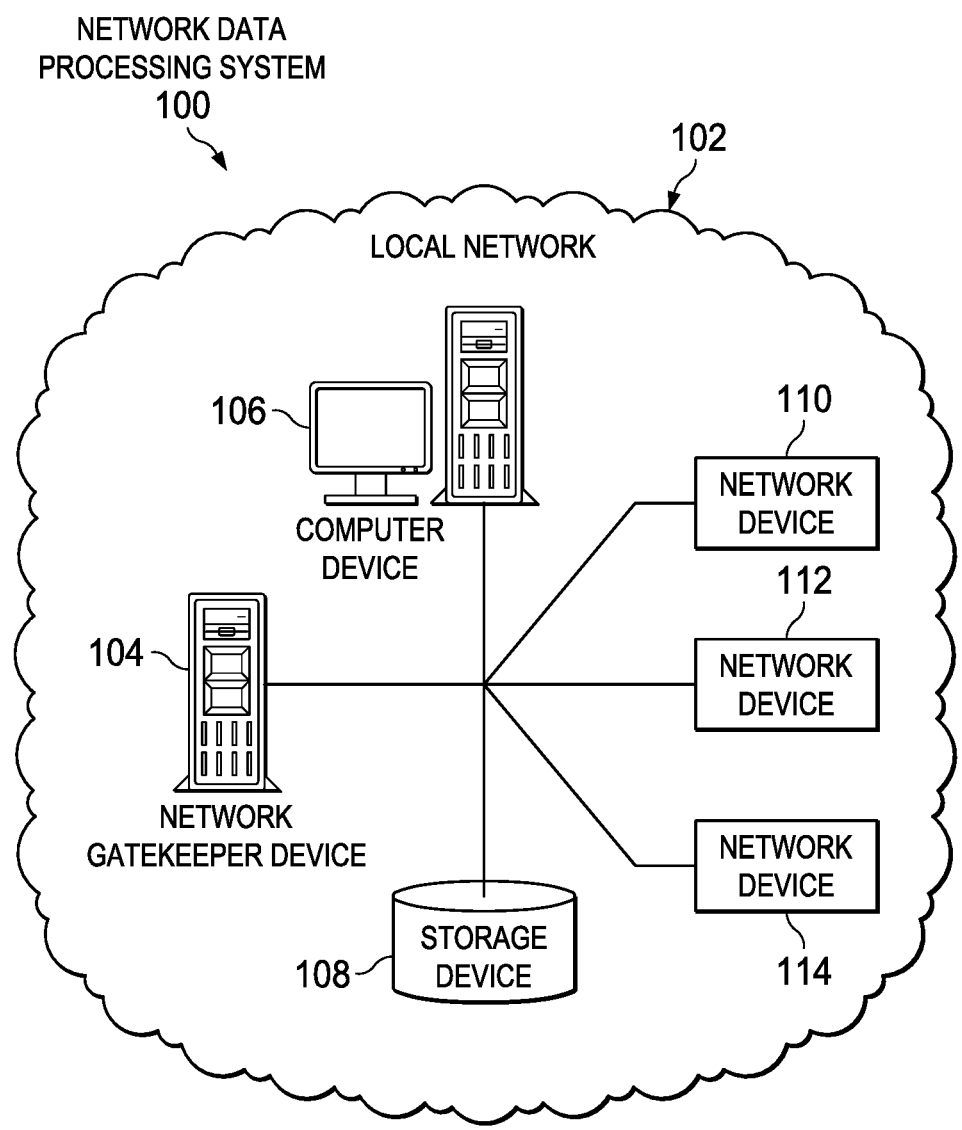
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
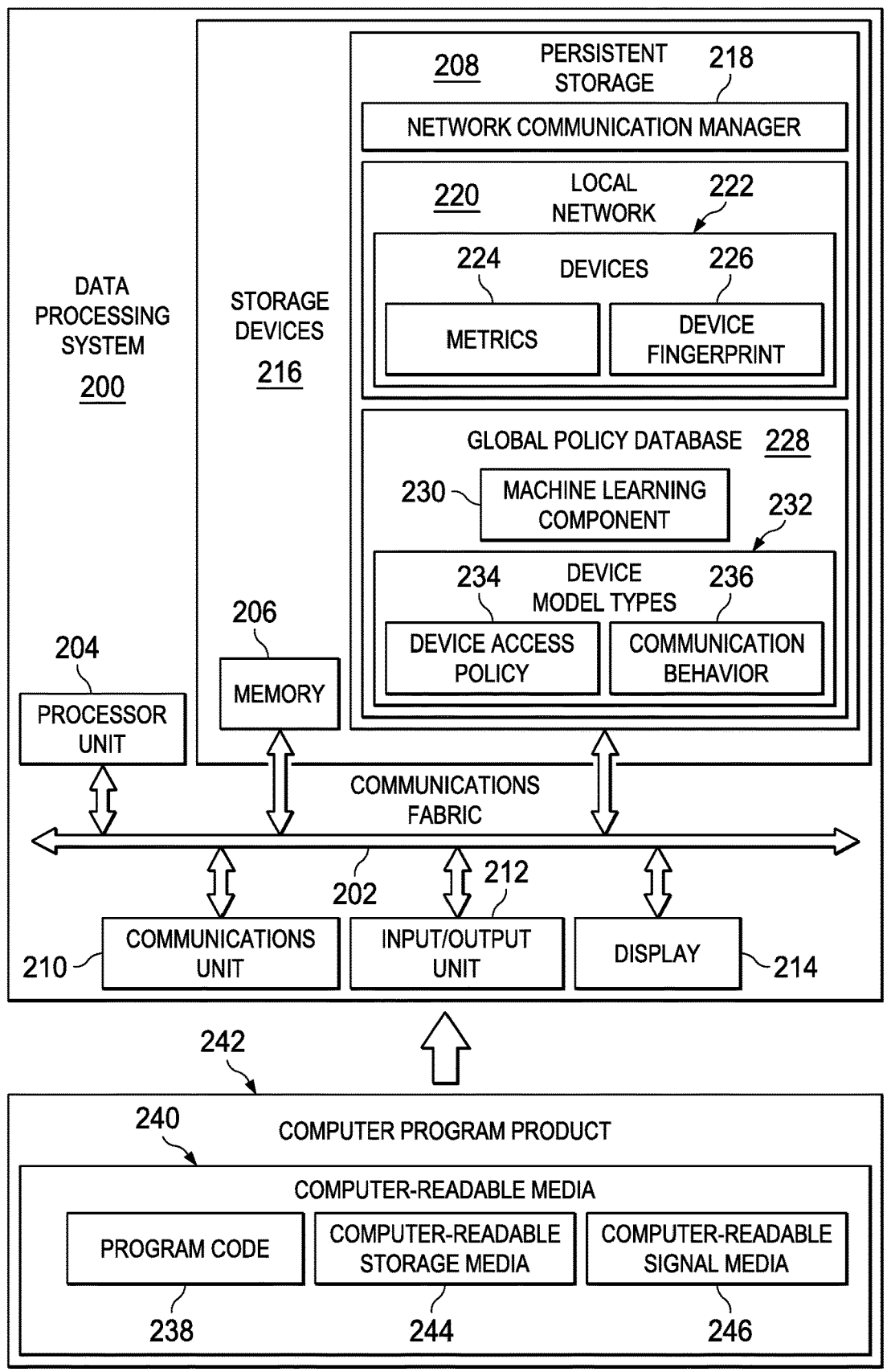
FIG. 2 is a diagram of a data processing system in which illustrative embodiments may be implemented.
Figure 3:
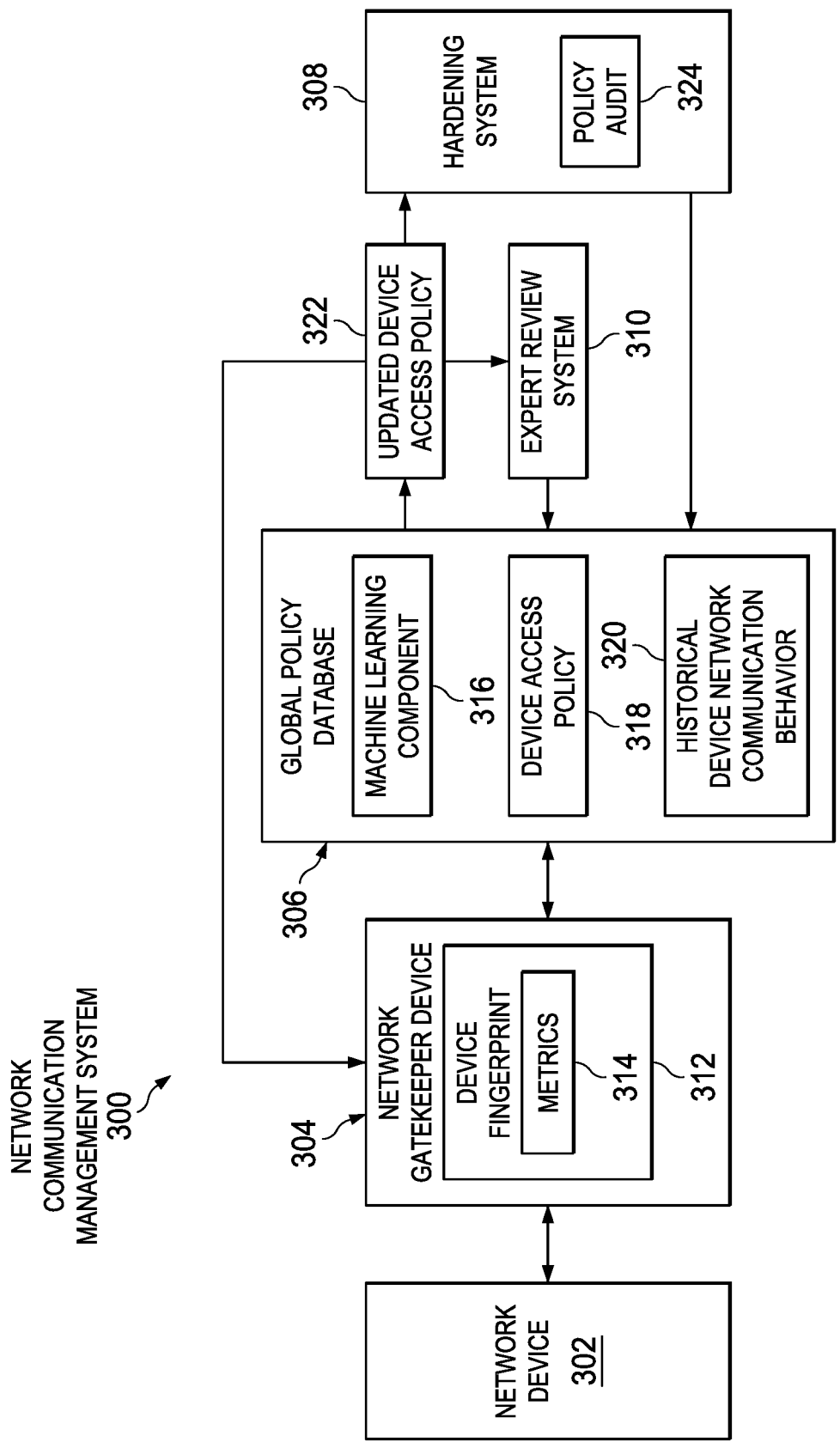
FIG. 3 is a diagram illustrating an example of a network communication management system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains local network 102, which is the medium used to provide communications links between the computers, data processing systems, and other devices connected together within network data processing system 100. Local network 102 may include connections, such as, for example, wire communication links and wireless communication links. Local network 102 represents a private network, such as a local area network, which may correspond to a home or business, for example.

In the depicted example, network gatekeeper device 104, computer device 106, storage device 108, network device 110, network device 112, and network device 114 are all connected within local network 102. Network gatekeeper device 104 may be, for example, a router, a switch, a server, or similar device, for routing network traffic or communications within local network 102. In other words, network gatekeeper device 104 manages the network communications, which correspond to internal network addresses within local network 102 and external network addresses outside local network 102, going to and coming from computer device 106, storage device 108, network device 110, network device 112, and network device 114 connected within local network 102. In addition, network gatekeeper device 104 represents a set of one or more network gatekeeper devices connected within local network 102.

Computer device 106 may be, for example, a network computer, a desktop computer, a laptop computer, a handheld computer, or similar device. Further, computer device 106 may represent a plurality of same or different computer devices connected within local network 102.

Storage device 108 represents any type of network storage device capable of storing any type of data in a structured format or an unstructured format. In addition, storage device 108 may represent a plurality of network storage devices.

Network device 110, network device 112, and network device 114 may be, for example, IoT devices, such as smart phones, smart watches, smart appliances, smart televisions, smart wearables, smart thermostats, gaming devices, smart sensors, network-connected switches, network-connected lightbulbs, network-connected door locks, and the like with wire or wireless communication links within local network 102. In addition, network devices 110, 112, and 114 may represent any number, type, or combination of network devices connected within local network 102.

Program code located in network data processing system 100 may be stored on a computer readable storage medium and downloaded to a computer or other data processing device for use. For example, program code may be stored on a computer readable storage medium on computer device 106 and downloaded to network device 110 over local network 102 for use on network device 110.

In the depicted example, network data processing system 100 may be implemented as a number of different types of communication networks, such as, for example, an intranet, a local area network, a virtual private network, a personal area network, or any combination thereof. FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a network gatekeeper device, such as network gatekeeper device 104 in FIG. 1, in which program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for applications and programs that may be loaded into memory 206. Processor unit 204 may be a set of one or more hardware processor devices or may be a multi-core processor, depending on the particular implementation.

Memory 206 and persistent storage 208 are examples of storage devices 216. A storage device is any piece of hardware that is capable of storing information, such as, for example, without limitation, data, program code in functional form, and/or other suitable information either on a transient basis and/or a persistent basis. Further, a storage device excludes a propagation medium. Memory 206, in these examples, may be, for example, a random-access memory, or any other suitable volatile or non-volatile storage device. Persistent storage 208 may take various forms, depending on the particular implementation.

In this example, persistent storage 208 stores network communication manager 218, which contains the program code or instructions implementing processes of the illustrative embodiments. However, it should be noted that even though network communication manager 218 is illustrated as residing in persistent storage 208, in an alternative illustrative embodiment network communication manager 218 may be a separate component of data processing system 200. For example, network communication manager 218 may be a hardware component coupled to communication fabric 202 or a combination of hardware and software components.

Network communication manager 218 controls the process of managing network communications, which correspond to internal network addresses within a local network and external network addresses outside the local network, going to and coming from each network device connected to the local network. The local network may be, for example, local network 102 in FIG. 1. Also, it should be noted that data processing system 200 also is connected to the local network. Network communication manager 218 manages the network communications to and from each respective network device connected to the local network using device access policies that correspond to each network device model type connected to the local network. In addition, network communication manager 218 monitors for aberrant network communication behavior within the local network based on historical network device model type communication behaviors. Aberrant network communication behavior may be, for example, malicious network communication behavior, irregular network communication behavior, or new network communication behavior. Upon detecting aberrant network communication behavior, network communication manager 218 performs a set of mitigation action steps, such as, for example, send an alert to a system administrator or security analyst, block the network traffic corresponding to the detected aberrant network communication behavior, and the like.

Local network 220 represents an identifier for the local network that data processing system 200 is connected to. Devices 222 represent identifiers for a plurality of network devices also connected to local network 220. Devices 222 may be any type of network device, such as, for example, IoT devices, smart devices, computers, data processing systems, storage devices, and the like. Devices 222 are capable of communicating with each other, as well as with devices external to local network 220.

Network communication manager 218 detects metrics 224 for each respective network device in devices 222. Metrics 224 may include, for example, IP or MAC address, network device model type, network device hardware and software versions, number and type of open ports, attempted network connections, network protocols used, network connection speed, network traffic patterns, and the like. Network communication manager 218 utilizes metrics 224 to generate device fingerprint 226 for each respective network device in devices 222. In other words, network communication manager 218 uses the detected metrics that correspond to a particular network device to generate a unique device fingerprint for that particular network device.

After generating the device fingerprints, network communication manager 218 sends the device fingerprints to a global policy database. Global policy database 228 represents an identifier for the global policy database that data processing system 200 is connected to. However, it should be noted that the global policy database is external to data processing system 200. Also, it should be noted that data processing system 200 may be connected to a set of one or more global policy databases. In addition, global policy database 228 may be connected to the same local network as data processing system or a public network. Alternatively, global policy database 228 may be a node in a cloud environment that provides a device access policy generation service.

Global policy database 228 is a central repository for network device information (e.g., device fingerprints, device access policies, and device historical communication behavior included within device profiles) from a plurality of different network gatekeeper devices, such as data processing system 200. Global policy database 228 includes machine learning component 230. Global policy database 228 utilizes machine learning component 230 to analyze the network device information received from the plurality of different network gatekeeper devices and identify device model types 232 of the network devices connected to each respective local network corresponding to each respective network gatekeeper device.

Device model types 232 represent a set of one or more different types of network device models connected to particular local network. In other words, a device model type for a particular network device, such as a laptop computer, refers to the specific model of that laptop computer and does not refer to the entire line of laptop computers provided by the manufacturer. Moreover, a device model type does not refer to each specific network device (e.g., each network device having a unique serial number) connected to the local network.

After identifying each device model type, machine learning component 230 generates device access policy 234 for each identified device model type based on the received network device information. Device access policy 234 is a set of one or more rules regarding network device communications for a particular device model type. For example, a particular smart refrigerator model type may have a corresponding device access policy of block all internal local network communication with other network devices within its local network and restrict external network access to its manufacturer only.

Further, global policy database 228 utilizes machine learning component 230 to analyze the network device information received from the plurality of different network gatekeeper devices and identify communication behavior 236 of each respective device model type. Communication behavior 236 represents a historical pattern of communications for each particular device model type. For example, the historical pattern of communications for the smart refrigerator model type may be communication with its manufacturer for software updates once a month. Network communication manager 218 may utilize communication behavior 236 to detect aberrant network communications for device model types 232. Furthermore, global policy database 228 utilizes machine learning component 230 to update the device access policies as new network device information is received from other network gatekeeper devices. Global policy database 228 sends the device access policies to network communication manager 218 to manage the network communications of the different device model types connected to its local network.

Communications unit 210, in this example, provides for communication with computers, data processing systems, and other network devices via the local network. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra-high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 238 is located in a functional form on computer readable media 240 that is selectively removable and may be loaded onto or transferred to data processing system 200 for running by processor unit 204. Program code 238 and computer readable media 240 form computer program product 242. In one example, computer readable media 240 may be computer readable storage media 244 or computer readable signal media 246. Computer readable storage media 244 may include, for example, an optical or magnetic disc that is inserted or placed into a drive or other device that is part of persistent storage 208 for transfer onto a storage device, such as a hard drive, that is part of persistent storage 208. Computer readable storage media 244 also may take the form of a persistent storage, such as a hard drive, a thumb drive, or a flash memory that is connected to data processing system 200. In some instances, computer readable storage media 244 may not be removable from data processing system 200.

Alternatively, program code 238 may be transferred to data processing system 200 using computer readable signal media 246. Computer readable signal media 246 may be, for example, a propagated data signal containing program code 238. For example, computer readable signal media 246 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 238 may be downloaded over a network to persistent storage 208 from another device or data processing system through computer readable signal media 246 for use within data processing system 200. For instance, program code stored in a computer readable storage media in a data processing system may be downloaded over a network from the data processing system to data processing system 200. The data processing system providing program code 238 may be a server computer, a client computer, or some other device capable of storing and transmitting program code 238.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable storage media 244 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In the course of developing illustrative embodiments, it was discovered that device aware network communication management requires generation of network access policies derived from monitored metrics. Variations in network access attempts need to be interpreted and determined whether these variations in behavior represent network security threats or valid traffic. Illustrative embodiments utilize a set of one or more local network gatekeepers to collect network metrics and network access request data from network devices connected to the local network. Then, this set of network gatekeepers generate a unique device fingerprint for each network device on the local network based on the collected metrics. The set of network gatekeepers send the generated device fingerprints to a global policy database.

The global policy database utilizes a period of training to generate and validate a set of policies defining permissible and impermissible network communications to and from each device model type based on the received data. The training period also defines a mechanism to generate a best-guess set of policies for an unknown device type. Subsequently, upon completion of training, the global policy database begins to process real-world network access request data from each local gatekeeper to refine the policies for device types in real-time using machine learning. Further, a hardening component audits the policies by performing simulations using the same data stream from the local gatekeepers. The results of these audits are then fed back into the global policy database, which updates its policies to correct any errors that are identified during an audit.

Each set of local gatekeepers then applies these policies generated by the global policy database to manage (e.g., allow or block) network traffic. A local network gatekeeper is a hardware device, such as, for example, a router, switch, firewall, or server, at the boundary of a local network with the ability to control traffic to and from other network devices on the local network. The local gatekeeper applies the access policies retrieved from the global policy database and informs the global policy database of access requests made by network devices within the local network so as to further refine the policies. The global policy database, which is a secure device, generates device access policies for a multitude of different network device model types.

The hardening system receives a stream of feedback from the local network gatekeepers and utilizes the feedback to simulate a variety of test cases with known correct answers. The simulated test cases are a known quantity and are developed with a particular ideal set of priorities, so as to be used to optimize the machine learning's coefficients to ensure correct behavior. Further, the hardening system also serves as an error correction mechanism as any failures in the machine learning's treatment of known simulated test cases is flagged as an issue with a coefficient that can be re-optimized.

Illustrative embodiments utilize an equation that creates a feedback loop with itself and the hardening component, so as to ensure constant updating of the policies. Additionally, because the data, which the equation operates on, are constantly varying, policies can change meaningfully over time. An example of the equation is as follows:

$$\sum a_n x_n + b_n \frac{\partial x_n}{\partial y_n} + c_n \frac{\partial x_n^2}{\partial y_n} + \ldots - \gamma t \geq h$$

where: n represents the number of parameters under observation in the model; $x_n$ represents an attempt by the device to access a simulated test case in which the device conformed to the parameter defined by n; $y_n$ represents total access attempts made by the device to any simulated test case in which the device conformed to the parameter defined by n; $a_n$, $b_n$, $c_n$, ... $k_n$ represent tuning coefficients continuously optimized to define the appropriate response of illustrative embodiments to all parameters under observation in the model; γ represents a coefficient managing the impact of time in between attempts to access a simulated test case; t represents time in seconds; and h represents a threshold above which an attempted access is considered valid.

The primary parameter under observation in any model is device model type and illustrative embodiments maintain an instance of the equation for each device model type registered or identified. Accordingly, the first set of terms in each equation (x_1) represents a simple record of the number of attempts made by devices of this particular model type. Additional dimensions of the equation (x_n where n>1) represent additional parameters under observation, such as bit traffic density, packet size, connection speed, connection protocol, or a number of other potential metrics. Illustrative embodiments then scale from a simple identity-only model up to an analysis of tens of metrics across multiple levels of derivation, both with respect to time and total number of attempted device or simulate test case accesses. The derivative of terms is taken into account in order to correctly identify changing access trends. For example, it is important to differentiate between a rise in network traffic due to a malicious attack as opposed to a rise in valid traffic to a popular device on the network.

As the number of network-connected IoT devices increases, it becomes more important to protect networks from such devices, which can be compromised or otherwise go rogue, causing network disruptions via DoS attacks, DDoS attacks, and similar mass attacks. These conditions are made more severe by the plethora of cheap, low-security network connected IoT devices, ranging from smart appliances, such as internet-connected lightbulbs and switches, to toys with wireless capabilities. Networks have traditionally been secured by firewalls or by other methods that prevent malicious traffic from entering a particular network. With the advent of potentially malicious IoT devices on local networks, themselves, it is important to provide protection from these malicious devices within the local networks, both for other local devices within the local networks and for remote devices located on remote networks, such as the Internet, for example.

One issue common to firewall systems is the difficulty of device identification. Devices are identified on a network by one of a few metrics, such as Internet Protocol (IP) address or Media Access Control (MAC) address. However, these metrics can be spoofed, allowing a malicious device to pose as a benign one. In addition, current solutions, such as packet analysis, require significant knowledge of the behavior of a network and what types of traffic are to be expected on a network. This knowledge can be difficult to obtain and the resulting solution difficult to maintain. Moreover, this type of network protection can require a highly device-specific solution. Because some metrics (e.g., IP addresses) do not clearly define device type and most metrics can be spoofed, an improved metric is needed. Such a metric can accurately identify device type to facilitate the creation of network access policies for specific device types in order to avoid complicated setup and maintenance by a system administrator.

Prior solutions of reverse firewalls are impeded by the difficulty of specifying appropriate policies for a wide range of device types on a network. Some devices, such as smart light switches and refrigerators, require access to a relatively short list of external network addresses. Other devices, such as personal computers or even network computers, require largely unfettered network access and typically have security measures of their own to provide protection from malicious devices connected to the network. Thus, it is essential that network traffic permissions and restrictions be tailored to each device type on a network based on its access requirements. On large networks, it is impractical to determine and specify the access requirements of each device. Also, it is impractical to identify and specify the appropriate policy as new devices are added to a network, which leads to the adoption of general policies that are inevitably either too restrictive or too permissive for the majority of devices on the network. This leads to performance losses and security gaps across a range of devices on the network. In order to solve these issues, policies must be assigned on a per-device basis without excessive user oversight. These policies also must be flexible enough to adapt to changes in each device use case (e.g., requiring more permissive policies) or each new threat observed on other networks (e.g., requiring more restrictive policies). Because most users at risk from malicious devices are not network security experts and tend to prefer minimal involvement in security setups at, for example, homes, schools, restaurants, and the like, a new automated and flexible solution requiring minimal user supervision is needed and presents benefits in terms of increased network security.

Illustrative embodiments take into account the shortcomings of prior network security systems and provide a process to regulate both local network traffic and external network traffic while facilitating ease of use and adoption. Illustrative embodiments extend the concept of reverse firewalls with two new and novel features: 1) device fingerprinting; and 2) machine learning applied to a global policy database. With these two additional features, illustrative embodiments are capable of providing accurate identification of devices and device types functioning on a network and automatically applying custom-tailored policies to each device on a network based on global device behavior data for that particular device type corresponding to a particular device without needing complicated setup or maintenance.

Illustrative embodiments improve over existing network security systems by providing protection from devices within the same network. For example, traditional firewalls are designed to protect network devices behind a firewall from malicious devices outside the firewall. Illustrative embodiments leverage the knowledge of device type, classification, and behavior, recognizing that network devices behind the firewall may still pose a threat to other network devices behind the firewall. As a result, illustrative embodiments apply policies for restricting internal device communication within a local network to devices that should only be communicating with external addresses (e.g., network addresses outside of the local network). For example, illustrative embodiments permit a particular type of local device, such as a smart refrigerator, within a local network to communicate with its manufacturer at an external network address for software updates, but not permit such as a device type to send traffic to a local device, such as a desktop computer, within the same local network. Further, illustrative embodiments also recognize the network security risk that local smart devices can pose to devices entirely outside the local network. For example, such local smart devices may be compromised or corrupted and used to perform a DDoS attack on a device having an external network address. To reduce this network security risk, illustrative embodiments flag and block any deviation from expected device communication behavior. This would include, for example, a compromised smart refrigerator attempting to contact a government website. Illustrative embodiments are novel because illustrative embodiments do not act as mere filters for incoming network traffic, but rather act as intelligent gateways to increase network security for devices both inside and outside a local network.

Furthermore, illustrative embodiments improve over existing network security systems by providing device fingerprinting. Traditional firewalls typically cannot depend on the identification information provided by devices sending traffic into a local network because this identification information, such as an IP address or MAC address, can be easily spoofed. Consequently, many firewalls rely on packet analysis rather than sender identification. Because illustrative embodiments monitor traffic within a local network, illustrative embodiments identify local network devices with increased reliability using network security scanning tools to create a device fingerprint, which provides more detailed and reliable information about the identity of a device. Because this device fingerprint contains more information (e.g., software and hardware versions, port and protocol information, frequency of network communication attempts, network connection latency, and the like) than traditional device identification information (e.g., IP and MAC addresses), a device fingerprint is a more reliable means of device identification. In addition, illustrative embodiments collect historical device behavior information regarding traffic speed, amount, and destination for each network device and any deviation from this historical device behavior is flagged as suspicious behavior and blocked by illustrative embodiments. Because illustrative embodiments identify devices based on device fingerprints, illustrative embodiments can apply custom-tailored device policies based on the fingerprint identification of a device without the need to guess the device's identity based on packet content analysis.

Moreover, illustrative embodiments improve over existing network security systems by providing global sourcing and machine learning applied to identity-based device policies. Because illustrative embodiments identify devices on a local network with relative certainty using device fingerprints, illustrative embodiments can collect and record information regarding the behavior of each network device in a central global policy repository. Illustrative embodiments apply machine learning to the information stored in the central global policy repository to develop custom-tailored policies that precisely reflect real-world network requirements corresponding to a particular type of device, such as a smart refrigerator. This level of precision is not possible without collecting data for a large number of identical devices located on different networks, which may be impossible without the reliable means of device identification provided by illustrative embodiments.

Illustrative embodiments first fingerprint and then identify devices on a local network. Because illustrative embodiments utilize available sources of information to produce a device fingerprint beyond a mere IP or MAC address, illustrative embodiments provide reliable device identification. This reliable device identification of illustrative embodiments makes device spoofing (i.e., masquerading as a different device) more difficult. In addition, this reliable device identification provides confidence in the identification of the device type corresponding to the identified device.

Metrics that illustrative embodiments may combine to form a device fingerprint are, for example: 1) MAC address of a device, which illustrative embodiments may use to identify manufacturer and device type; 2) number and type of open ports on the device; 3) attempted network connections made by the device; 4) network protocols used by the device; 5) network connection speed of the device; 6) network traffic patterns of the device; and 7) hardware and software versions of the device. By illustrative embodiments combining these metrics to form a device fingerprint, it is considerably more difficult for a malicious device to fool illustrative embodiments as to the identity of the device. For example, a MAC address can specify a manufacturer, since the MAC address must be registered by the manufacturer, while the number of ports and connection speed of each port can be matched to a particular device type in that manufacturer's product catalog. Network traffic patterns can further support this determination, as particular devices will tend to share use cases. For example, compare the periodic software update network signal sent from a smart refrigerator to the constant stream of high-volume network traffic sent from a server or to the consistent stream of low-volume network traffic sent to a music streaming device. While IP or MAC addresses can be changed by malicious actors, it is much more difficult for these malicious actors to spoof all of this device information and behavior.

If device metrics disagree with known device metrics (e.g., a MAC address registered to a particular manufacturer with a specified number of ports does not match any known product of that manufacturer), then illustrative embodiments flag that device as suspicious, send a security notification regarding that device, and apply a restrictive policy to that device (e.g., block all local network communication by that device). While in some cases, this may cause loss of service, illustrative embodiments allow a user, such as a system administrator, to edit or remove the restrictive device policy to regain desired service functionality. In addition, illustrative embodiments utilize machine learning to modify current device policy or generate new device policies based on recorded historical device information and behavior as opposed to current network security solutions that do not identify device type and real-world use cases.

If illustrative embodiments detect an unknown device on the local network, illustrative embodiments apply a best-guess device policy corresponding to a closest matching known device found in the global policy database. Device metrics have a pre-defined ranking of significance when determining closest matching known devices. In other words, certain device metrics have a higher level of importance when determining closest matching devices. For example, illustrative embodiments may require the unknown device on the local network to have a same manufacturer or number of ports as the selected closest matching device in the global policy database. This device metric ranking may be user-specified or determined by illustrative embodiments using machine learning.

Once illustrative embodiments acquire a device's fingerprint (detect the above-mentioned metrics corresponding to the device via a scanning process), illustrative embodiments compare the acquired device fingerprint against the global policy database of other device fingerprints that have been recorded from a plurality of networks. Illustrative embodiments match the acquired device fingerprint to a closest matching device fingerprint in the database and apply a device policy that corresponds to the device associated with the closest matching device fingerprint. Illustrative embodiments periodically update the global policy database with network traffic and behavior data for each instance of a particular device type across all networks using illustrative embodiments. Thus, illustrative embodiments utilize global device data collected from a plurality of networks to define policies as opposed to only using local device data collected from a local network. Policies are lists of network address ranges, ports, and protocols, which a particular device type may utilize to send and receive network traffic. Policies also may include details on permissible and/or impermissible network traffic patterns, such as, for example, send and receive frequency and amount for certain network addresses or address types.

Illustrative embodiments monitor and record network traffic patterns of all devices on a local network and periodically update the global policy database with this network traffic information for each device model type. Monitored device network traffic metrics include, for example, network addresses that transmit data to a device, network addresses that the device sends transmits to, frequency of the data transmissions, data packet size, network protocol utilized by the device, and the like.

When devices behave according to corresponding device model type policies, illustrative embodiments assign a higher confidence score to those policies in the database. By aggregating device model type behavior metrics across many devices on many networks, illustrative embodiments can generate comprehensive and detailed device model type policies with minimal user input or oversight. However, illustrative embodiments may utilize a team of subject matter experts to refine device model type policies in situations where statistical analysis may be misleading. When devices deviate from their corresponding device model type policies, illustrative embodiments throttle or completely block network traffic coming from these devices and issue an alert notification to a user regarding the potential network security threat.

Illustrative embodiments utilize machine learning to aid in device model type classification and evaluation of new device behaviors. In addition, illustrative embodiments upload any device model type deviation from policy to the global database, where illustrative embodiments utilize the machine learning to determine whether a particular device model type deviation from policy is: 1) an isolated incident (e.g., no change in policy); 2) a large-scale threat appearing suddenly across a range of devices on different networks (e.g., enforce policy more strictly (i.e., do not allow user override)); 3) part of a gradual change in the use case of a particular device model type (e.g., modify policy to increase permissiveness of this kind of network traffic behavior); or 4) due to a device software update. By illustrative embodiments using machine learning, device model type policies can evolve over time to maintain the correct amount of permissiveness and restrictiveness for each device type encountered on a network.

With reference now to FIG. 3, a diagram illustrating an example of a network communication management system is depicted in accordance with an illustrative embodiment. Network communication management 300 is a system of software and hardware components for managing network communications, which correspond to internal network addresses within a local network and external network addresses outside the local network, going to and coming from a network device connected to the local network. Network communication management 300 may be implemented in a network of data processing systems, such as network data processing system 100 in FIG. 1.

In this example, network communication management 300 includes network device 302, network gatekeeper device 304, global policy database 306, hardening system 308, and expert review system 310. However, it should be noted that network communication management 300 is only meant as an example and not as a limitation on illustrative embodiments. In other words, network communication management 300 may include any number of network devices, network gatekeeper devices, global policy databases, and other data processing systems not shown.

Network device 302 and network gatekeeper device 304 may be, for example, network device 110 and network gatekeeper device 104 in FIG. 1. Global policy database 306 may be, for example, global policy database 228 in FIG. 2.

Network gatekeeper device 304 generates device fingerprint 312, such as device fingerprint 226 in FIG. 2, for network device 302 based on metrics 314, which correspond to network device 302. Metrics 314 may be, for example, metrics 224 in FIG. 2. Network gatekeeper device 304 sends device fingerprint 312 to global policy database 306 for analysis by machine learning component 316, such as machine learning component 230 in FIG. 2. Machine learning component 316 generates device access policy 318 and historical device network communication behavior 320 based on the information within device fingerprint 312, which corresponds to network device 302.

Global policy database 306 shares device access policy 318 and historical device network communication behavior 320 with network gatekeeper device 304 to manage network communications corresponding to network device 302. As global policy database 306 receives other device fingerprints from other network gatekeeper devices, machine learning component 316 generates updated device access policy 322, which is a modification of device access policy 318 corresponding to network device 302.

Global policy database 306 shares updated device access policy 322 with network gatekeeper device 304, hardening system 308, and expert review system 310. Hardening system 308 generates policy audit 324. Policy audit 324 identifies errors in device access policy 318 and updated device access policy 322. Hardening system 308 sends policy audit 324 to machine learning component 316 for continued learning purposes. Expert review system 310 represents a computer system corresponding to a user, such as a system administrator or security analyst, to review device access policy 318 and updated device access policy 322 and optionally provide feedback to machine learning component 316.

Figure 4:
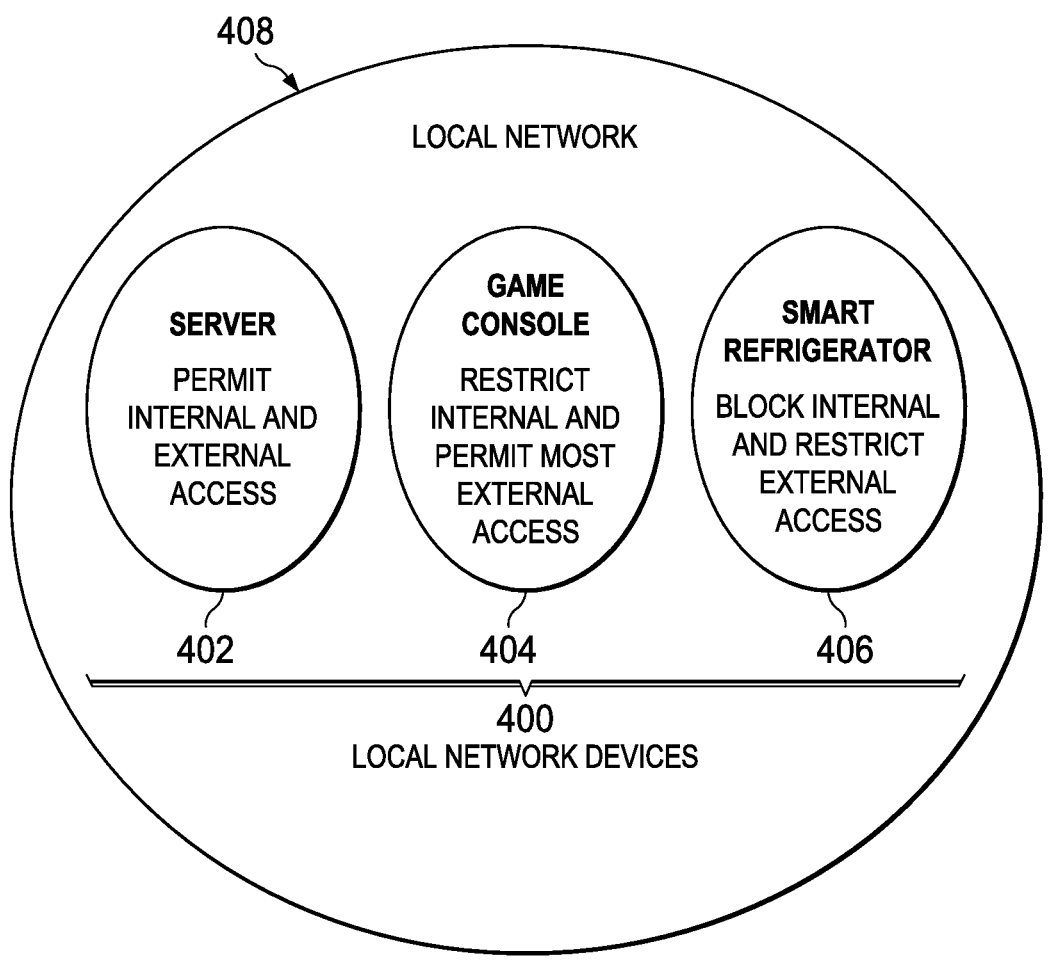
FIG. 4 is a diagram illustrating specific examples of local network devices and their corresponding device access policies in accordance with an illustrative embodiment.

With reference now to FIG. 4, a diagram illustrating specific examples of local network devices and their corresponding device access policies is depicted in accordance with an illustrative embodiment. In this example, local network devices 400 include server 402, game console 404, and smart refrigerator 406. However, it should be noted that local network devices 400 represent specific examples of network devices only. In other words, illustrative embodiments are not restricted to such. Illustrative embodiments may include any number, type, or combination of local network devices. Further, local network devices 400 are connected to local network 408, such as local network 102 in FIG. 1 or local network 220 in FIG. 2.

In this example, server 402 has a corresponding device access policy of permit internal and external access. Game console 404 has a corresponding device access policy of restrict internal and permit most external access. Smart refrigerator 406 has a corresponding device access policy of block internal and restrict external access. These corresponding device access policies are meant as examples only and not as limitations on different illustrative embodiments. In other words, illustrative embodiments may utilize any number, type, or combination of device access policies for a given network device model type.

Figure 5A:
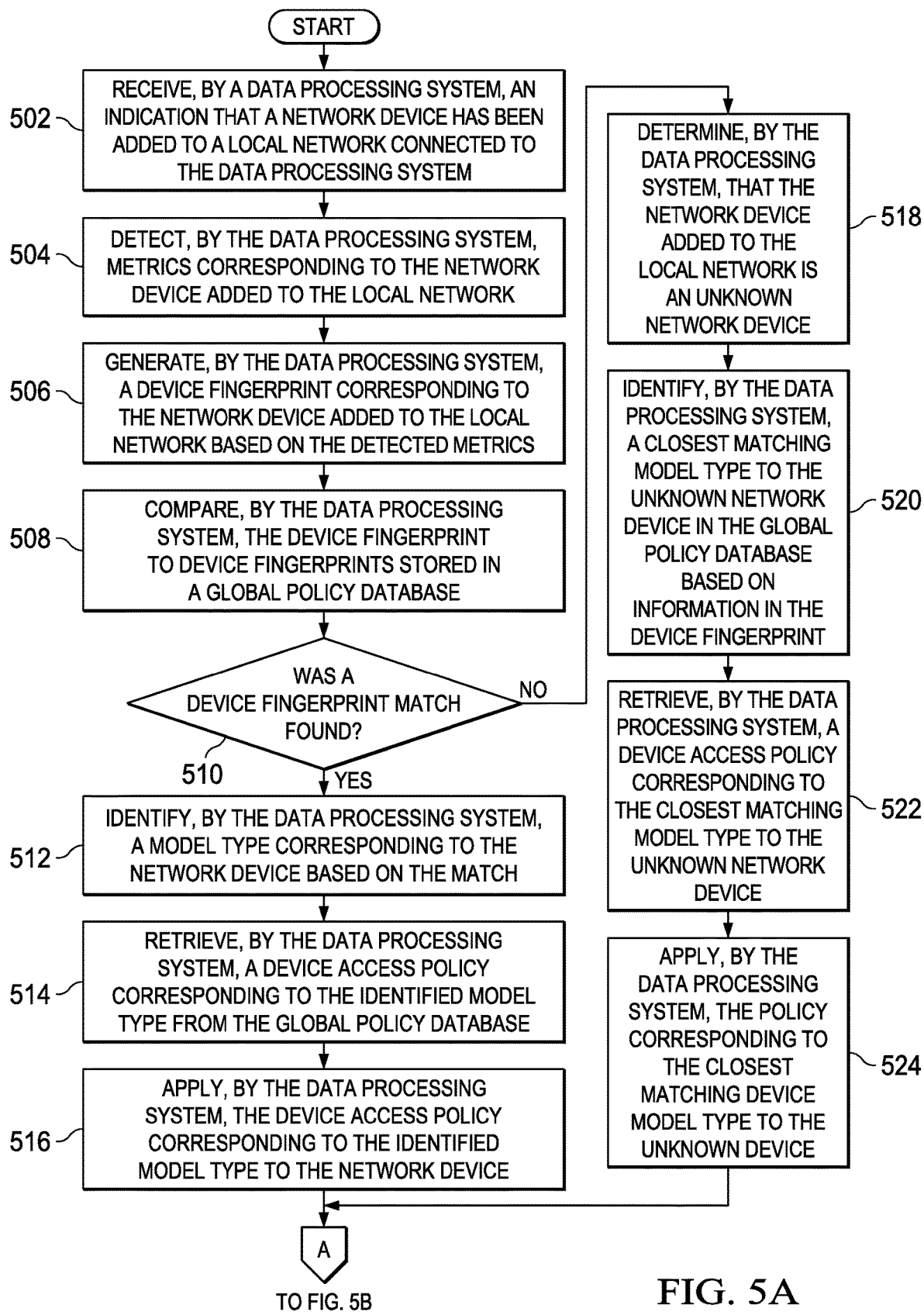
FIGS. 5A-5B are flowchart illustrating a process for applying a device access policy to a corresponding device model type in accordance with an illustrative embodiment.
Figure 5B:
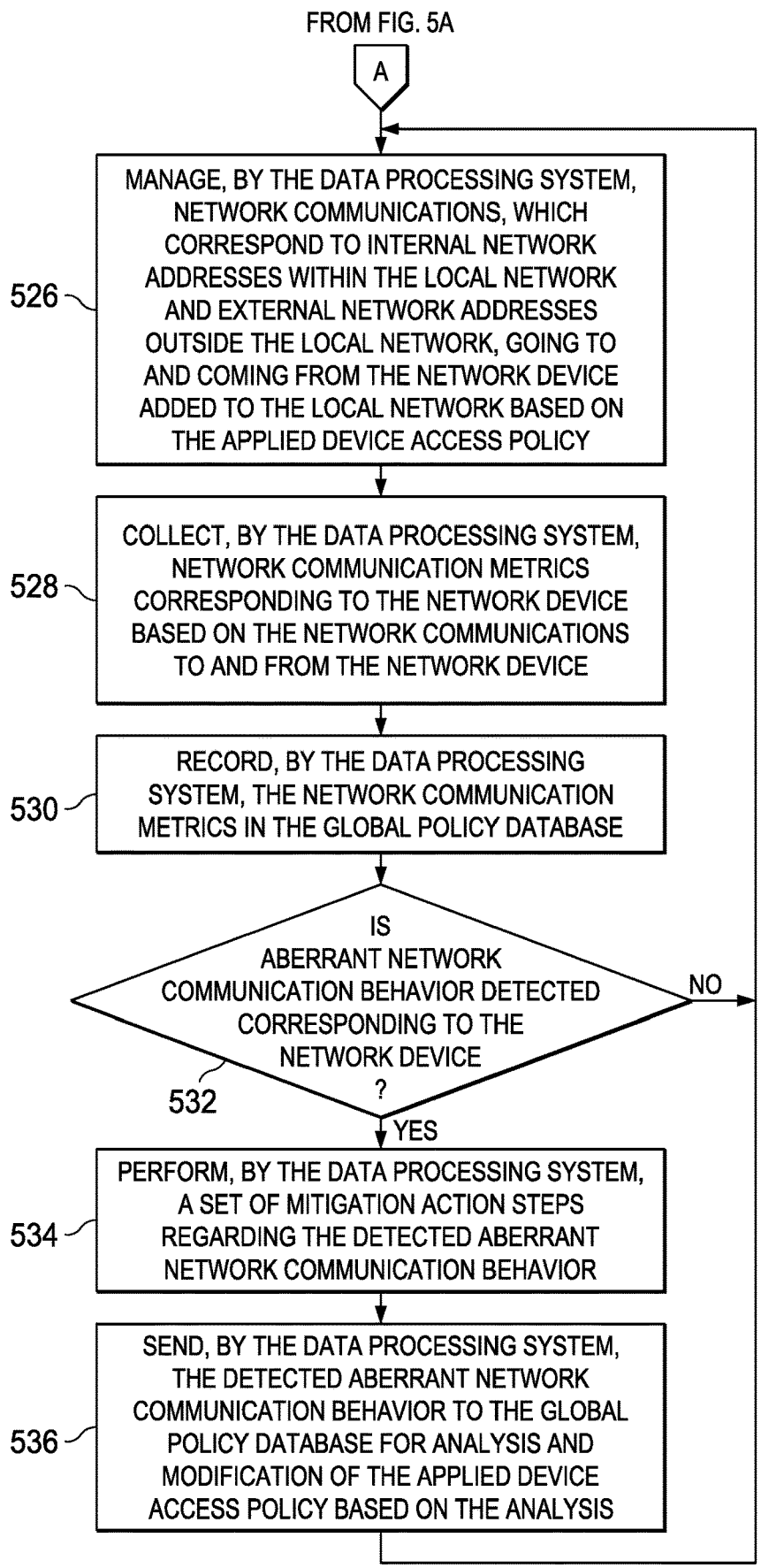

With reference now to FIGS. 5A-5B, a flowchart illustrating a process for applying a device access policy to a corresponding device model type is shown in accordance with an illustrative embodiment. The process shown in FIGS. 5A-5B may be implemented in a data processing system, such as, for example, network gatekeeper device 104 in FIG. 1, data processing system 200 in FIG. 2, or network gatekeeper device 304 in FIG. 3.

The process begins when the data processing system receives an indication that a network device has been added to a local network connected to the data processing system (step 502). The network device may be, for example, network device 110 in FIG. 1 or smart refrigerator 406 in FIG. 4. The local network may be, for example, local network 102 in FIG. 1 or local network 408 in FIG. 4.

In response to receiving the indication that the network device been added to the local network at step 502, the data processing system detects metrics corresponding to the network device added to the local network (step 504). The metrics may be, for example, metrics 224 in FIG. 2 or metrics 314 in FIG. 3. The metrics may include a network device identifier, such as an IP or MAC address, a network device model type, network device hardware and software versions, number and type of open ports on the device, attempted network connections made by the device, network protocols used by the device, network connection speed of the device, network traffic patterns of the device, and the like.

In addition, the data processing system generates a device fingerprint corresponding to the network device added to the local network based on the detected metrics (step 506). The data processing system compares the device fingerprint to device fingerprints stored in a global policy database (step 508). The global policy database may be, for example, global policy database 306 in FIG. 3.

Afterward, the data processing system makes a determination as to whether a device fingerprint match was found in the global policy database between the device fingerprint corresponding to the network device and one of a plurality of device fingerprints stored in the global policy database (step 510). If the data processing system determines that a device fingerprint match was found in the global policy database between the device fingerprint corresponding to the network device and one of the plurality of device fingerprints stored in the global policy database, yes output of step 510, then the data processing system identifies a model type corresponding to the network device based on the match (step 512). The model type may be, for example, device model type 232 in FIG. 2. Further, the data processing system retrieves a device access policy corresponding to the identified model type from the global policy database (step 514). Moreover, the data processing system applies the device access policy corresponding to the identified model type to the network device (step 516). Thereafter, the process proceeds step 526.

Returning again to step 510, if the data processing system determines that a device fingerprint match was not found in the global policy database between the device fingerprint corresponding to the network device and one of the plurality of device fingerprints stored in the global policy database, no output of step 510, then the data processing system determines that the network device added to the local network is an unknown network device (step 518). In addition, the data processing system identifies a closest matching model type to the unknown network device in the global policy database based on information in the device fingerprint (step 520). The data processing system retrieves a device access policy corresponding to the closest matching model type to the unknown network device (step 522). Furthermore, the data processing system applies the device access policy corresponding to the closest matching model type to the unknown network device (step 524).

Subsequently, the data processing system manages network communications, which correspond to internal network addresses within the local network and external network addresses outside the local network, going to and coming from the network device added to the local network based on the applied device access policy (step 526). Further, the data processing system collects network communication metrics corresponding to the network device based on the network communications to and from the network device (step 528). The data processing system records the network communication metrics in the global policy database as historical device network communication behavior for a model type corresponding to the network device (step 530).

The data processing system makes a determination as to whether aberrant network communication behavior is detected corresponding to the network device based on historical device network communication behavior for that model type (step 532). The aberrant network communication behavior may be, for example, malicious behavior, abnormal behavior, or uncharacteristic behavior, such as a new network communication behavior for that network device. If the data processing system determines that aberrant network communication behavior is not detected corresponding to the network device, no output of step 532, then the process returns to step 526 where the data processing system continues to manage the internal and external network communications to and from the network device based on the applied network access policy. If the data processing system determines that aberrant network communication behavior is detected corresponding to the network device, yes output of step 532, then the data processing system performs a set of mitigation action steps regarding the detected aberrant network communication behavior (step 534). The set of mitigation steps may include, for example, sending an alert notification to a user, such as a system administrator or security analyst for review, blocking the detected aberrant network communication behavior, and the like. Furthermore, the data processing system sends the detected aberrant network communication behavior to the global policy database for analysis and modification of the applied device access policy based on the analysis (step 536). Thereafter, the process returns to step 526 where the data processing system continues to manage the internal and external network communications to and from the network device based on the modified device access policy.

Thus, illustrative embodiments of the present invention provide a method, data processing system, and computer program product for managing internal and external network communications to and from a network device connected to a local network. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for managing network communications, the method comprising:
receiving, by a data processing system, an indication that a network device has been added to a local network connected to the data processing system;
responsive to the data processing system receiving the indication that the network device been added to the local network, detecting, by the data processing system, metrics corresponding to the network device added to the local network;
generating, by the data processing system, a device fingerprint corresponding to the network device added to the local network based on the detected metrics;
comparing, by the data processing system, the device fingerprint to device fingerprints stored in a global policy database;
determining, by the data processing system, whether a device fingerprint match was found in the global policy database between the device fingerprint corresponding to the network device and one of a plurality of device fingerprints stored in the global policy database;
responsive to the data processing system determining that a device fingerprint match was found in the global policy database between the device fingerprint corresponding to the network device and one of the plurality of device fingerprints stored in the global policy database, identifying, by the data processing system, a model type corresponding to the network device based on the match;

retrieving, by the data processing system, a device access policy corresponding to the identified model type from the global policy database; and applying, by the data processing system, the device access policy corresponding to the identified model type to the network device.

2. The method of claim 1 further comprising:

responsive to the data processing system determining that a device fingerprint match was not found in the global policy database between the device fingerprint corresponding to the network device and one of the plurality of device fingerprints stored in the global policy database, determining, by the data processing system, that the network device added to the local network is an unknown network device;

identifying, by the data processing system, a closest matching model type to the unknown network device in the global policy database based on information in the device fingerprint;

retrieving, by the data processing system, a device access policy corresponding to the closest matching model type to the unknown network device; and applying, by the data processing system, the device access policy corresponding to the closest matching model type to the unknown network device.

3. The method of claim 2 further comprising:

managing, by the data processing system, network communications to and from the network device added to the local network based on the applied device access policy, wherein the network communications correspond to internal network addresses within the local network and external network addresses outside the local network.

4. The method of claim 3 further comprising:

collecting, by the data processing system, network communication metrics corresponding to the network device based on the network communications to and from the network device; and recording, by the data processing system, the network communication metrics in the global policy database as historical device network communication behavior for a model type corresponding to the network device.

5. The method of claim 4 further comprising:

determining, by the data processing system, whether aberrant network communication behavior is detected corresponding to the network device based on historical device network communication behavior for that model type;

responsive to the data processing system determining that aberrant network communication behavior is detected corresponding to the network device, performing, by the data processing system, a set of mitigation action steps regarding the detected aberrant network communication behavior; and sending, by the data processing system, the detected aberrant network communication behavior to the global policy database for analysis and modification of the applied device access policy based on the analysis.

6. The method of claim 5, wherein the set of mitigation action steps include sending an alert notification to a user and blocking the detected aberrant network communication behavior.

7. The method of claim 1, wherein the metrics include a network device identifier, a network device model type, network device hardware and software versions, number and type of open ports on the network device, attempted network connections made by the network device, network protocols used by the network device, network connection speed of the network device, and network traffic patterns of the network device.

8. A data processing system for managing network communications, the data processing system comprising:

a bus system;

a storage device connected to the bus system, wherein the storage device stores program instructions; and a processor connected to the bus system, wherein the processor executes the program instructions to:

receive an indication that a network device has been added to a local network connected to the data processing system;

detect metrics corresponding to the network device added to the local network in response to receiving the indication that the network device been added to the local network;

generate a device fingerprint corresponding to the network device added to the local network based on the detected metrics;

compare the device fingerprint to device fingerprints stored in a global policy database;

determine whether a device fingerprint match was found in the global policy database between the device fingerprint corresponding to the network device and one of a plurality of device fingerprints stored in the global policy database, identify a model type corresponding to the network device based on the match in response to determining that a device fingerprint match was found in the global policy database between the device fingerprint corresponding to the network device and one of the plurality of device fingerprints stored in the global policy database;

retrieve a device access policy corresponding to the identified model type from the global policy database; and apply the device access policy corresponding to the identified model type to the network device.

9. The data processing system of claim 8, wherein the processor further executes the program instructions to:

determine that the network device added to the local network is an unknown network device in response to determining that a device fingerprint match was not found in the global policy database between the device fingerprint corresponding to the network device and one of the plurality of device fingerprints stored in the global policy database;

identify a closest matching model type to the unknown network device in the global policy database based on information in the device fingerprint;

retrieve a device access policy corresponding to the closest matching model type to the unknown network device; and apply the device access policy corresponding to the closest matching model type to the unknown network device.

10. A computer program product for managing network communications, the computer program product comprising a computer readable storage medium having program instructions embodied therewith, the program instructions executable by a data processing system to cause the data processing system to perform a method comprising:

receiving, by the data processing system, an indication that a network device has been added to a local network connected to the data processing system;

responsive to the data processing system receiving the indication that the network device been added to the local network, detecting, by the data processing system, metrics corresponding to the network device added to the local network;

generating, by the data processing system, a device fingerprint corresponding to the network device added to the local network based on the detected metrics;

comparing, by the data processing system, the device fingerprint to device fingerprints stored in a global policy database;

determining, by the data processing system, whether a device fingerprint match was found in the global policy database between the device fingerprint corresponding to the network device and one of a plurality of device fingerprints stored in the global policy database, responsive to the data processing system determining that a device fingerprint match was found in the global policy database between the device fingerprint corresponding to the network device and one of the plurality of device fingerprints stored in the global policy database, identifying, by the data processing system, a model type corresponding to the network device based on the match;

retrieving, by the data processing system, a device access policy corresponding to the identified model type from the global policy database; and applying, by the data processing system, the device access policy corresponding to the identified model type to the network device.

11. The computer program product of claim 10 further comprising:

responsive to the data processing system determining that a device fingerprint match was not found in the global policy database between the device fingerprint corresponding to the network device and one of the plurality of device fingerprints stored in the global policy database, determining, by the data processing system, that the network device added to the local network is an unknown network device;

identifying, by the data processing system, a closest matching model type to the unknown network device in the global policy database based on information in the device fingerprint;

retrieving, by the data processing system, a device access policy corresponding to the closest matching model type to the unknown network device; and applying, by the data processing system, the device access policy corresponding to the closest matching model type to the unknown network device.

12. The computer program product of claim 11 further comprising:

managing, by the data processing system, network communications to and from the network device added to the local network based on the applied device access policy, wherein the network communications correspond to internal network addresses within the local network and external network addresses outside the local network.

13. The computer program product of claim 12 further comprising:

collecting, by the data processing system, network communication metrics corresponding to the network device based on the network communications to and from the network device; and recording, by the data processing system, the network communication metrics in the global policy database as historical device network communication behavior for a model type corresponding to the network device.

14. The computer program product of claim 13 further comprising:

determining, by the data processing system, whether aberrant network communication behavior is detected corresponding to the network device based on historical device network communication behavior for that model type;

responsive to the data processing system determining that aberrant network communication behavior is detected corresponding to the network device, performing, by the data processing system, a set of mitigation action steps regarding the detected aberrant network communication behavior; and sending, by the data processing system, the detected aberrant network communication behavior to the global policy database for analysis and modification of the applied device access policy based on the analysis.

* * * * *